Patented Sept. 1, 1925.

1,552,217

UNITED STATES PATENT OFFICE.

CARL MARX, OF WYOMING, NEW JERSEY, ASSIGNOR TO UNION SULPHUR COMPANY, A CORPORATION OF NEW JERSEY.

METHOD OF PURIFYING SULPHUR.

No Drawing. Application filed August 22, 1922. Serial No. 583,652.

*To all whom it may concern:*

Be it known that I, CARL MARX, a citizen of the United States, residing in Wyoming, Milburn Township, Essex County, New Jersey, have invented a new and useful Method of Purifying Sulphur, of which the following is a specification.

Sulphur, such as obtained by methods involving melting of the sulphur under ground and raising the same to the surface by means of superheated water, is of sufficient purity for general commercial purposes. It is, however, lacking in the bright yellow color and brilliant appearance demanded of a more highly purified product, and contains noticeable amounts of hydrocarbonaceous and petroleum-like matter and occluded gases, as well as water in a form not readily removable. Although suitable in this condition for agricultural and manufacturing purposes, there are many applications of sulphur in which a still purer product is demanded, and the process as outlined in the present specification, yields such a product.

In the manufacture of highly purified sulphur from the commercial product as in the preparation of flowers of sulphur, the distillation is usually carried on in retorts from which the vapors are led to immense chambers from which the air has been partially driven out by the hot gases, after which the openings in the chambers are closed during the major portion of the distillation period. The air in the chamber oxidizes sulphur to sulphur oxides, which in the presence of oxygen and moisture normally present in atmosphere, forms sulphuric acid, small amounts of which are prone to contaminate sulphur obtained in this manner, the sulphuric acid forming a normally occurring and objectionable impurity incident to the purification of sulphur by this process. The above process is only carried out at high temperatures with resultant danger and loss; is extremely slow, and apparatus of large capacity is required.

As the result of my researches, it has been found that by vaporizing sulphur at relatively low temperatures under greatly diminished pressure, not only are the impurities readily removed, but a product is obtained of high porosity and great fluffiness; possessing a brilliant and permanent bright yellow color; practically free from extraneous matter, and of a very fine state of subdivision. These properties are considered highly desirable in sulphur intended for medicinal and pharmaceutical purposes, as an insecticide and in the rubber industry.

The present process widely differs from that employed in the manufacture of that highly purified sulphur known as "flowers of sulphur", in that temperatures very much lower are employed in my process, due to the fact that the distillation of the sulphur takes place under a vacuum of 26 to 28.5 inches. Whereas sulphur vaporizes at ordinary temperature at about 444° C., it boils in a vacuum at about 140° C.

In carrying my process into effect, sulphur of the trade is first heated under atmospheric pressure until it is molten, the temperature being then slowly raised until the sulphur is in its most liquid and mobile state, the result being that moisture and occluded gases are removed, and insoluble matter deposited by gravity. The liquid sulphur in an anhydrous and practically gas-free condition, is next submitted to further heating, by passage by pipe into an adjacent retort in which the atmospheric pressure has been substantially removed, this retort being connected with a vacuum chamber suitably cooled, wherein the distilled sulphur is allowed to deposit. The temperature of distillation is between 140° C and 160° C., being less in temperature with increase of vacuum, it being desirable that a vacuum of 28 inches or greater be maintained in the system. Under these conditions the sulphur is rapidly vaporized, the vapors condensing in the vacuum receiver in a highly fluffy and porous condition. The sulphur obtained is of a bright yellow color, free from extraneous or carbonaceous matter, and of a state of purity hitherto unattained except that prepared by tedious and expensive methods involving chemical reactions. The process may be made continuous by periodically feeding into the distillation retort, sulphur from which moisture and gases have been removed, and periodically withdrawing from the cooled vacuum chamber by means of a worm arrangement or otherwise, the sulphur deposited thereon without breaking the vacuum, by ways now known.

The size of apparatus required per unit weight of sulphur purified, is also much smaller than that employed in the present methods of sulphur distillation and in the formation of flowers of sulphur; and due to the materially lower heat required to vaporize sulphur in a vacuum, the heat consumption by my method is materially reduced over other methods now in use.

In ordinary distillation (Ullmann, Enzyklopedie der technischen Chemie, 1922, vol. 10, page 138) a space of 8,100 cubic feet per ton of sulphur refined in a period of 24 hours is required, whereas in the present process, the same weight of sulphur may be purified in the same length of time in a space of less than 500 cubic feet. In the older method of sulphur purification a temperature in excess of 425° C. is employed, whereas in the present process the maximum temperature may be placed at 170° C., resulting in the economy of fuel of about half. Furthermore this process may readily be arranged so as to be continuous—an impossibility with the processes now in use involving the periodic opening of large chambers after the process has been discontinued for one or more days in order to allow the chamber and contents to cool.

Again, in the methods of sulphur distillation as now carried on, much of the resultant product is in the form of large, hard masses of sulphur which require either re-melting and distillation and pouring into suitable forms, or mechanical comminution before they are of use in the trade, whereas by the distillation of sulphur in a vacuum by my process, the percentage of sulphur not in an impalpable powder is very small, and generally negligible. The apparatus as involved in my process consists in a sulphur pre-heater and melting pot exposed to the atmosphere; means for transference of the melted sulphur to a vacuum subliming still; means for transference of the vapors from this still to the vacuum chamber; a vacuum chamber which may or may not be artificially cooled, and may or may not be provided with arrangement whereby the deposited sulphur may be periodically removed without interference with the vacuum; a dust chamber and connections therewith from the vacuum chamber; and the usual vacuum arrangements.

What is claimed as new and is desired to be protected by me in Letters Patent is:—

1. A method of purifying sulphur consisting in heating the same under greatly diminished pressure and condensing the vapors formed in suitable chambers.

2. A method of improving the color and enhancing the properties of sulphur by distilling the same in an anhydrous state under greatly diminished pressure.

3. A method for the purification of sulphur by distillation by distilling said sulphur from which moisture, occluded gases and extraneous matter has been removed, at a temperature of approximately 160° C. under a vacuum of 26 to 28.5 inches, and periodically removing the sulphur in a light, porous, finely divided form from a vacuum chamber, substantially as described.

4. A method for the preparation of purified sulphur consisting in heating sulphur of the trade under atmospheric pressure until moisture and occluded gases have been removed and the extraneous impurities allowed to subside; transferring said liquid sulphur into a vacuum still; distilling said liquid sulphur under diminished pressure of not less than 26 inches; passing the vapors into a vacuum condensing chamber; and periodically removing the purified sulphur from said vacuum chamber, substantially as specified.

5. A method for the preparation of purified sulphur consisting in heating sulphur of the trade under atmospheric pressure until moisture and occluded gases have been removed and the extraneous impurities allowed to subside; transferring said liquid sulphur into a vacuum still; distilling said liquid sulphur under diminished pressure of not less than 26 inches; passing the vapors into a vacuum condensing chamber; and periodically removing the purified sulphur from said vacuum chamber, without destroying the vacuum, substantially as specified.

This specification signed and witnessed this twenty-first day of August, 1922.

CARL MARX.